(12) United States Patent
Yoon et al.

(10) Patent No.: US 8,406,484 B2
(45) Date of Patent: Mar. 26, 2013

(54) FACIAL RECOGNITION APPARATUS, METHOD AND COMPUTER-READABLE MEDIUM

(75) Inventors: Suk June Yoon, Seoul (KR); Kyung Shik Roh, Seongnam-si (KR); Seung Yong Hyung, Yongin-si (KR); Sung Hwan Ahn, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 271 days.

(21) Appl. No.: 12/980,913

(22) Filed: Dec. 29, 2010

(65) Prior Publication Data
US 2011/0164792 A1 Jul. 7, 2011

(51) Int. Cl.
*G06K 9/00* (2006.01)
*G06T 15/00* (2011.01)
*G06T 11/20* (2006.01)

(52) U.S. Cl. ........ 382/118; 382/100; 382/154; 345/419; 345/441

(58) Field of Classification Search .................. 382/118, 382/154, 115, 100, 117, 162, 168, 172, 173, 382/181, 190, 203, 219, 224, 225, 305; 345/592, 345/419, 441, 589, 427, 421; 358/497, 474
See application file for complete search history.

(56) References Cited

U.S. PATENT DOCUMENTS

| 4,218,822 | A * | 8/1980 | Derossi ........................... 33/1 D |
| 6,154,559 | A * | 11/2000 | Beardsley ....................... 382/103 |
| 6,434,849 | B1 * | 8/2002 | Hermann ......................... 33/529 |
| 7,203,356 | B2 * | 4/2007 | Gokturk et al. ................ 382/154 |
| 7,436,988 | B2 * | 10/2008 | Zhang et al. .................. 382/118 |
| 7,804,997 | B2 * | 9/2010 | Geng et al. .................... 382/154 |

* cited by examiner

*Primary Examiner* — Sheela Chawan
(74) *Attorney, Agent, or Firm* — Staas & Halsey LLP

(57) ABSTRACT

Two-dimensional image information and three-dimensional image information of a subject are acquired, facial recognition is performed using the two-dimensional image information to determine whether a recognized face is a registered user's face, an elliptical model of the user is matched to the three-dimensional image information to calculate an error if it is determined that the recognized face is the user's face, and it is determined whether the user's face is improperly used based on the error. The subject's face is determined using the two-dimensional image information and the three-dimensional image information of the subject and it is determined whether the recognized face is improperly used, thereby improving facial recognition reliability. Thus, information security is improved.

23 Claims, 11 Drawing Sheets

FACIAL RECOGNITION APPARATUS, METHOD AND COMPUTER-READABLE MEDIUM

CROSS-REFERENCE TO RELATED APPLICATIONS

This application claims the benefit of Korean Patent Application No. 10-2010-0000500, filed on Jan. 5, 2010 in the Korean Intellectual Property Office, the disclosure of which is incorporated herein by reference.

BACKGROUND

1. Field

Example embodiments relate to a facial recognition apparatus, method and computer-readable medium with improved security reliability.

2. Description of the Related Art

As society has become more information oriented, importance of information security and identification has increased.

In the past, a key, a password, an ID card, a smart card and the like were used for information security and identification. However, these have poor portability and may be lost. In addition, they may be forged, falsified or surreptitiously used. In order to solve such problems, information security and identification technology using biometrics has been developed.

Biometrics is used to indicate that a portion of the body of a person is recognized to perform identification, and includes fingerprint recognition, iris recognition, voice recognition, signature recognition, facial recognition, and the like. Since biometrics is performed using a portion of the body of the person, biometrics provides excellent convenience and security. Accordingly, research into biometrics has been actively conducted.

Since facial recognition may be performed without spontaneous agreement of an authentication subject, a recognition process is conveniently and easily performed. Thus, development of and research into facial recognition has been actively conducted.

In facial recognition, an image of a person's face is acquired by focusing on the person's face, a face area is extracted from the acquired image using edge and color information, and feature points such as eyes, nose and mouse are extracted from the face area, thereby recognizing the person's face.

At this time, the color and direction of an illumination, various facial expressions, various angles and the like are considered.

Regarding facial recognition, even when an unregistered person uses the portrait photo of a registered person, facial recognition is performed by extracting feature points such as eyes, nose and mouth of a face area from the portrait photo. Therefore, the same result as when recognizing the actual face of the registered person is obtained.

Thus, since facial recognition is performed using only the image of the person, illegal use of the registered person's photo is not prevented.

Since the unregistered person performs identification using the portrait photo of the registered person, information security is not secured. Thus, the reliability of the facial recognition used for information security and identification is low.

SUMMARY

Therefore, it is an aspect of the example embodiments to provide a facial recognition apparatus, method and computer-readable medium recognizing a subject's face using two-dimensional image information and three-dimensional image information of a subject and determining whether a recognized face is a registered user's face used surreptitiously or improperly to improve facial recognition reliability and information security.

The foregoing and/or other aspects are achieved by providing a facial recognition apparatus including a two-dimensional information acquisition unit to acquire two-dimensional image information of a subject, a three-dimensional information acquisition unit to acquire three-dimensional image information of the subject, a user information database to store an elliptical model corresponding to three-dimensional face information of a user and two-dimensional face information of the user and a control unit to perform facial recognition using the two-dimensional image information of the subject, to determine whether a recognized face is the user's face, to match the elliptical model of the user to the three-dimensional image information to calculate an error if it is determined that the recognized face is the user's face, and to determine whether the user's face is improperly used based on the error.

The three-dimensional information acquisition unit may acquire distance information corresponding to a Time-Of-Flight (TOF) of an infrared ray irradiated to the subject and incident thereto.

The control unit may include a determination unit to determine that the user's face is improperly used if the error exceeds a reference value and to determine that the subject is the same person as the user if the error is equal to or less than the reference value.

The facial recognition apparatus may further include a display unit to display whether the user's face is improperly used according to an instruction of the control unit.

The control unit may include a face extraction unit to extract a face area based on the two-dimensional image information and the three-dimensional image information.

The face extraction unit may extract the face area from the three-dimensional image information using edge information.

The control unit may match the elliptical model to the three-dimensional image information of the face area using Iterative Closest Point (ICP).

The control unit may calculate an error between a plane of the elliptical model and a plane of the three-dimensional image information.

The facial recognition apparatus may further include an input unit to receive user registration information and personal information of the user, and an ellipsoid generation unit to generate the elliptical model using a size of an ellipsoid corresponding to the face area of the user, and the control unit may store the personal information of the user if the user registration information is received through the input unit and store the two-dimensional face information and the elliptical model of the user in the user information database.

The foregoing and/or other aspects are achieved by providing a facial recognition method including acquiring, by a processor, two-dimensional image information and three-dimensional image information of a subject, performing, by the processor, facial recognition using the two-dimensional image information, determining, by the processor, whether the recognized face is a registered user's face, matching, by the processor, an elliptical model of the user to the three-dimensional image information to calculate an error upon determining that the recognized face is the user's face and determining, by the processor, whether the user's face is improperly used based on the error.

The acquiring of the three-dimensional image information may include irradiating the subject with infrared light, acquiring distance information corresponding to a Time-Of-Flight (TOF) of the infrared light, and generating three-dimensional image information corresponding to the distance information.

The matching of the elliptical model of the user to the three-dimensional image information may be performed using Iterative Closest Point (ICP).

The calculating of the error may include calculating an error between a plane of the elliptical model and a plane of the three-dimensional image information.

The determining of whether the user's face is improperly used based on the error may include determining whether the subject is the user's face used improperly if the error exceeds a reference value, and determining whether the subject is the same person as the user if the error is equal to or less than the reference value.

The matching of the elliptical model of the user to the three-dimensional image information may further include extracting a face area based on the two-dimensional image information and the three-dimensional image information, and matching the elliptical model to the face area.

The facial recognition method may further include receiving personal information of the user if user registration information is input, receiving two-dimensional image information and three-dimensional image information of the user, performing facial recognition using the two-dimensional image information to acquire two-dimensional face information, generating the elliptical model using the two-dimensional image information and the three-dimensional image information, and storing the personal information of the user, the two-dimensional face information and the elliptical model to perform user registration.

The foregoing and/or other aspects are achieved by providing a facial recognition method including acquiring, by a processor, three-dimensional image information of a subject, extracting, by the processor, a face area from the three-dimensional image information, generating, by the processor, an elliptical model using an ellipsoid corresponding to the face area, performing, by the processor, facial recognition using the three-dimensional image information of the subject, determining, by the processor, whether a recognized face is a user's face, matching, by the processor, the elliptical model to the three-dimensional image information to calculate an error, if it is determined that the recognized face is the user's face; and determining whether the user's face is improperly used based on the error.

The matching of the elliptical model to the three-dimensional image information of the face area may be performed using Iterative Closest Point (ICP).

The generating of the ellipsoid may include generating an ellipsoid formed by two diameters of the ellipsoid corresponding to the face area and a normal line to an intersection point between the two diameters, and the normal line has a predetermined diameter.

The determining of whether the user's face is improperly used may include determining whether the user's face is improperly used if the error exceeds a reference value, and determining whether the subject is a same person as the user if the error is equal to or less than the reference value.

According to the example embodiments, a subject's face may be determined using two-dimensional image information and three-dimensional image information of the subject and determination as to whether a recognized face is a registered user's face being used improperly may be performed, thereby improving facial recognition reliability. Thus, information security is improved.

The foregoing and/or other aspects are achieved by providing a method of acquiring, by a processor, two-dimensional and three-dimensional information of a first face, performing, by the processor, facial recognition on the two-dimensional information and determining whether the first face matches a second face stored in a user information database, comparing, by the processor, an elliptical model of the first face based on the three-dimensional information with an elliptical model of the second face stored in the user information database and determining, by the processor, if the second face differs from the first face by more than a predetermined amount based on the performing and the comparing.

According to another aspect of one or more embodiments, there is provided at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings.

Figure 1:
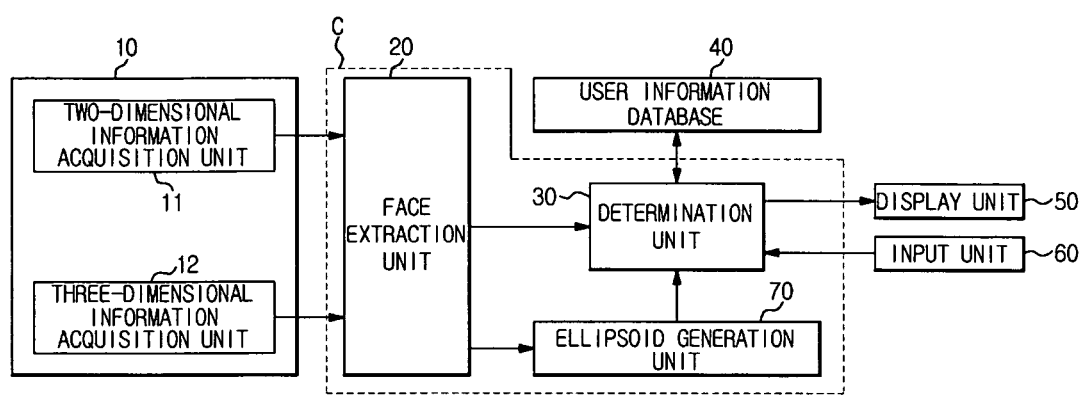
FIG. 1 is a block diagram of a facial recognition apparatus according to example embodiments.

FIG. 1 is a block diagram of a facial recognition apparatus according to example embodiments, which may include an image acquisition unit 10, a control unit 1, a user information database 40, a display unit 50, and an input unit 60. The control unit 1 may perform facial recognition and include a face extraction unit 20, a determination unit 30 and an ellipsoid generation unit 70.

The image acquisition unit 10 may acquire the image of a subject, and include a two-dimensional information acquisition unit 11 to acquire two-dimensional image information of a subject and a three-dimensional information acquisition unit 12 to acquire three-dimensional image information of the subject.

The image acquisition unit 10 may be a Time-Of-Flight (TOF) camera to acquire both the two-dimensional image information and the three-dimensional image information (depth image) of the subject.

The two-dimensional image information and the three-dimensional image information of the subject may be respectively acquired by different cameras.

More particularly, the two-dimensional information acquisition unit 11 may acquire the two-dimensional image of the subject using light. When light is focused by a focusing unit (not shown) and the focused light is sensed by a image pickup unit (an image sensor such as a Complementary Metal-Oxide-Semiconductor (CMOS) image sensor or a Charge Coupled Device (CCD) which is not shown), the two-dimensional information acquisition unit 11 may converts the signal of the light sensed by the image pickup unit into an electrical signal and store the image of the converted electrical signal as an image file with two-dimensional image information.

The light sensed by the image pickup unit of the two-dimensional information acquisition unit 11 may be converted into two-dimensional image information with brightness, color, and coordinate information, according to the intensity and location thereof.

The three-dimensional information acquisition unit 12 may irradiate the subject with infrared light, count the TOF of the infrared light reflected from the subject and incident thereto, and calculate distance information corresponding to the counted TOF.

The three-dimensional information acquisition unit 12 may store three-dimensional image information with the distance information of the subject. The three-dimensional image with the distance information may be called a depth image.

The TOF may indicate a difference between a time t1 when the infrared light is emitted from a light emitting element (not shown) of the TOF camera and a time t2 when the infrared light is reflected from the subject located on the front side thereof and is then incident to the TOF camera, i.e., TOF=t1−t2.

The distance of the subject measured by the TOF camera is d=(c×TOF)/2. Here, c denotes the speed of light.

The three-dimensional information acquisition unit 12 may acquire the three-dimensional image information with the distance information and location information of the subject. X and Y axes may denote the location information and a Z axis denotes the distance information.

Figure 2A:
FIGS. 2 and 3 are views illustrating acquisition of image information in a facial recognition apparatus according to example embodiments.
Figure 2B:
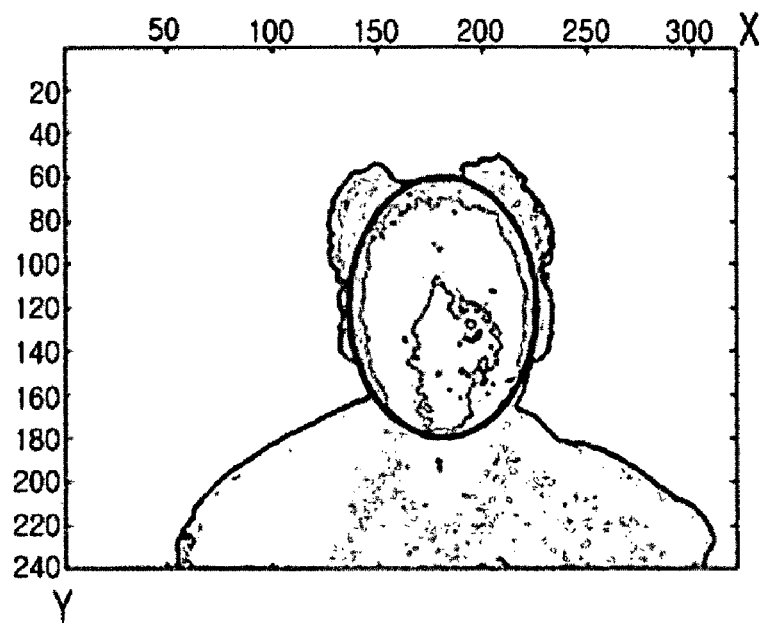
Figure 2C:
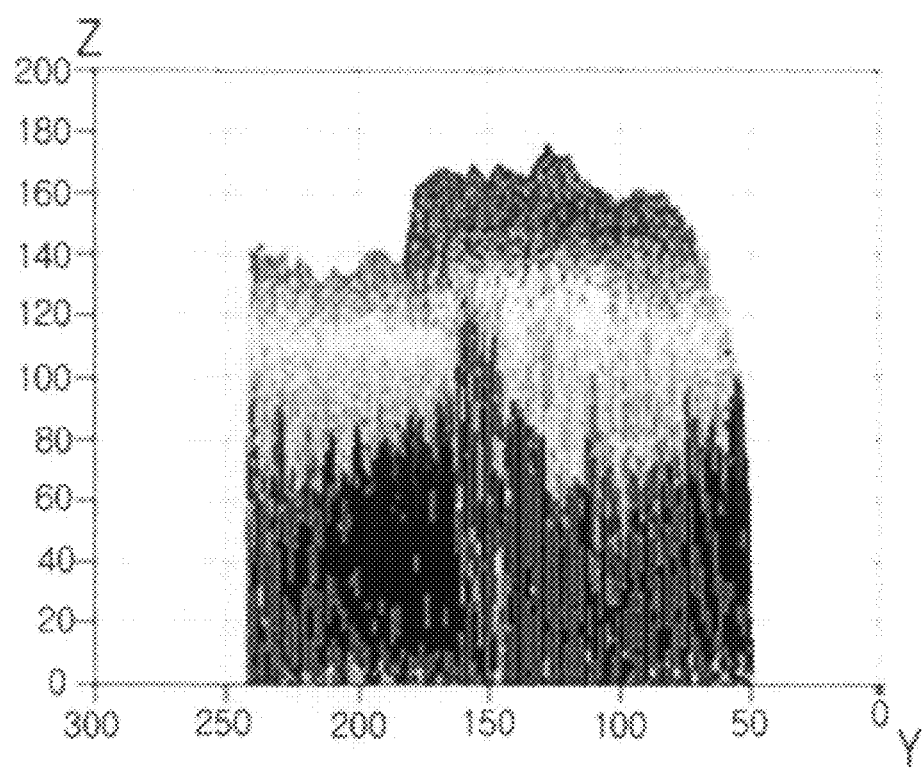

FIGS. 2 and 3 are views illustrating acquisition of image information in a facial recognition apparatus according to example embodiments. FIG. 2A shows a two-dimensional image when a subject is an actual person, FIG. 2B shows three-dimensional image information of the X and Y axes when the subject is an actual person, and FIG. 2C shows three-dimensional image information of the Y and Z axes when the subject is an actual person.

Figure 3A:
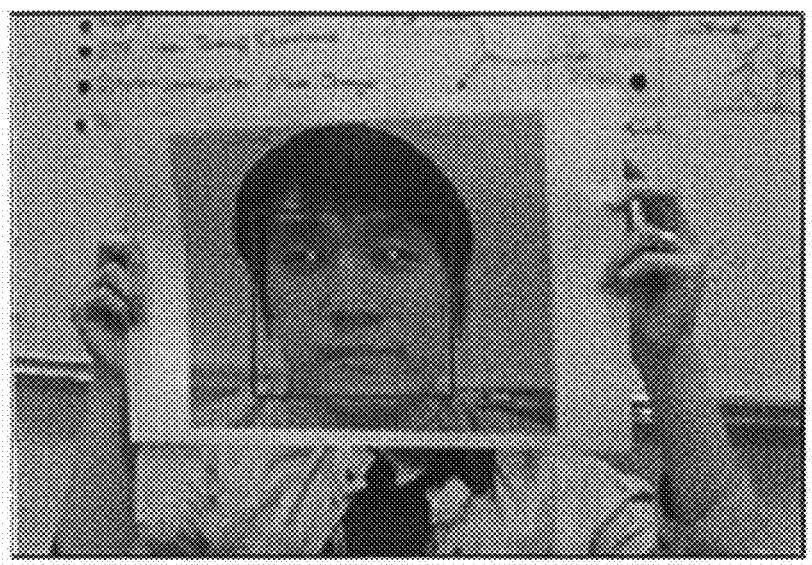
Figure 3B:
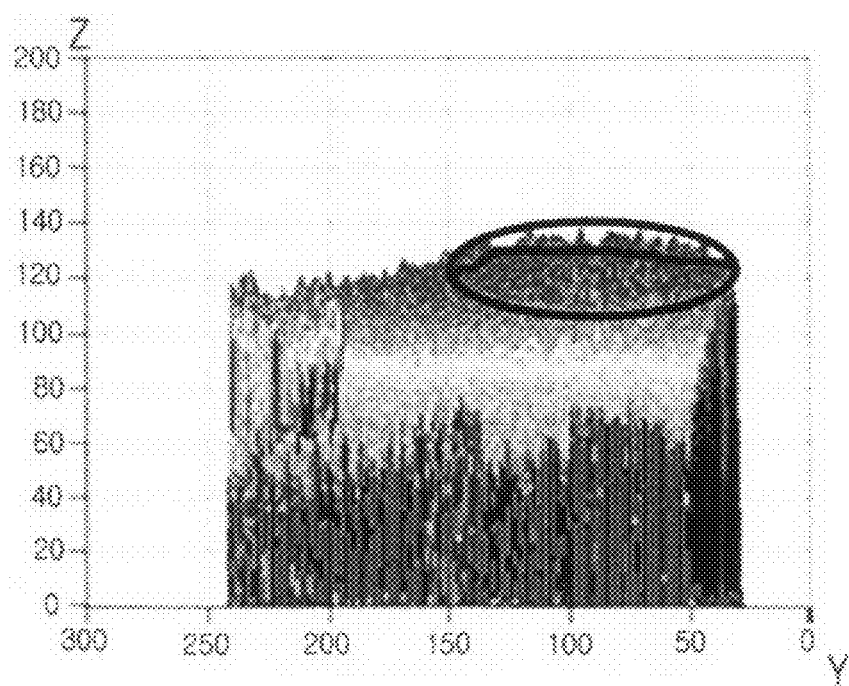
Figure 3C:
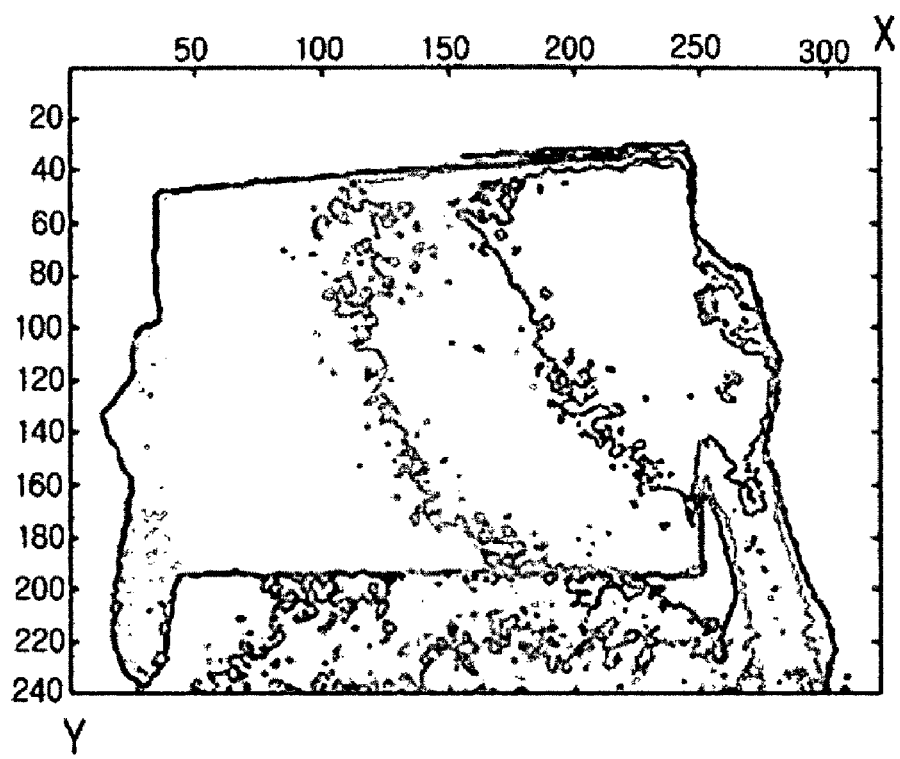

FIG. 3A shows a two-dimensional image when the subject is a photo, FIG. 3B shows three-dimensional image information of the Y and Z axes when the subject is the photo, and FIG. 3C shows three-dimensional image information of the X and Y axes when the subject is the photo.

The three-dimensional information acquisition unit 12 of the image acquisition unit 10 may acquire the three-dimensional image information using the TOF of the infrared light. Even when the color of the subject and the color of the background are equal, the subject may be easily identified to detect the distance and the three-dimensional image information of the subject may be acquired without being illuminated.

The control unit 1 may perform facial recognition using the two-dimensional image information of the subject, determine whether the recognized face is the face of the user, match the elliptical model of the user to the three-dimensional image information if it is determined that the recognized face is the face of the user to calculate an error, and determine whether the face of the user is improperly used based on the error.

When user registration information is input through the input unit 60, the control unit 1 may transmit the personal information of the user input by the input unit 60 to the user information database 40 and the personal information of the user may be stored in the user information database 40.

The control unit 1 may generate two-dimensional face information and an elliptical model of the user using the two-dimensional image information and the three-dimensional image information acquired by the image acquisition unit 10 and transmit and store the generated two-dimensional face information and elliptical model of the user in the user information database 40.

The control unit 1 may include the face extraction unit 20, the determination unit 30 and the ellipsoid generation unit 70, which will now be described in detail.

The face extraction unit 20 may detects a face area (a dotted line) using the two-dimensional image information as shown in FIG. 2A, and extract edges from the three-dimensional image information within the detected area and extract a face area based on the extracted edges as shown in FIG. 2B. The face extraction unit 20 may extract three-dimensional face image information within the face area as shown in FIG. 2C.

The face area may be detected using the edge and color information of the image of the subject.

The determination unit 30 may detect the face area using the edge and color information of the two-dimensional image information of the subject, extract feature points such as eyes, nose, and mouth from the face area to perform facial recognition, and compare the feature points of the recognized face with the user's two-dimensional face information stored in the user information database 40 to determine whether the recognized face is the user's face.

The user's two-dimensional face information stored in the user information database 40 may have the feature point information of the user's face.

Figure 4A:
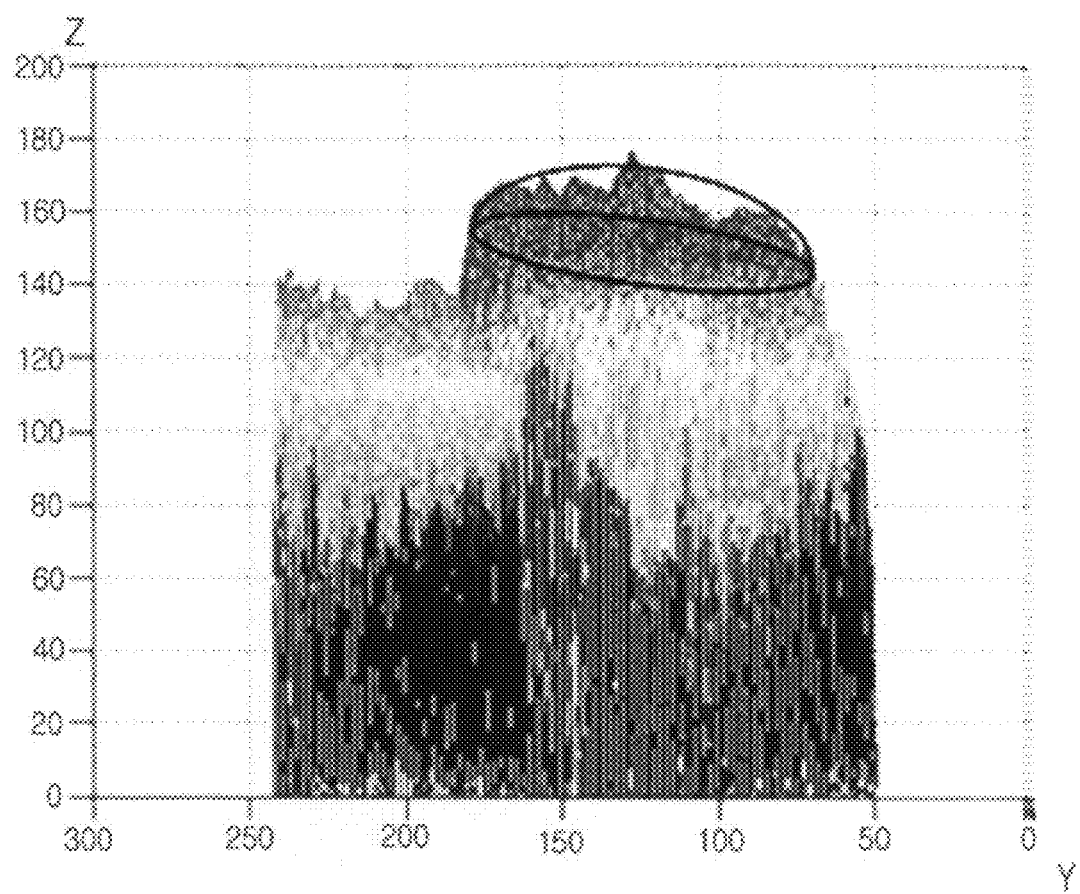
FIG. 4 is a view illustrating Iterative Closest Point (ICP) matching in a facial recognition apparatus according to example embodiments.
Figure 4B:
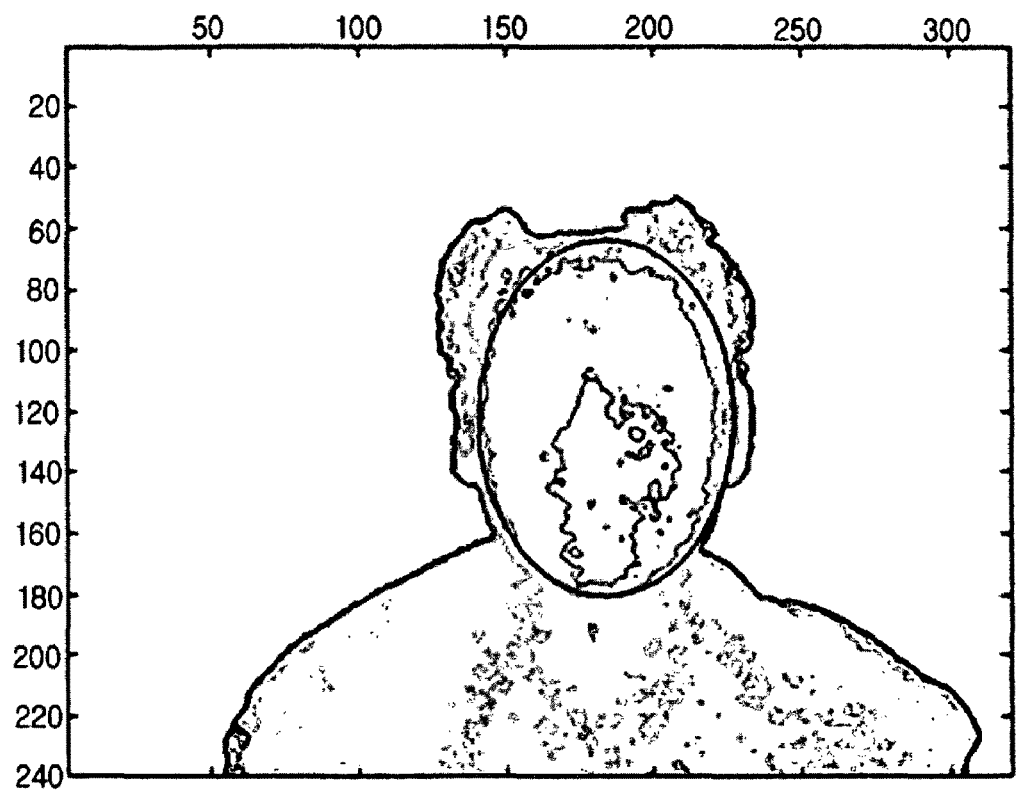

If the subject's face matches the user's face, the determination unit 30 may extract the elliptical model of the user from the user information database and match the extracted elliptical model of the user to the three-dimensional image information as shown in FIGS. 4A and 4B.

Matching may be performed using Iterative Closest Point (ICP).

In the ICP matching, a pose change degree between the subject's face and the elliptical model stored in the user information database may be detected and the detected degree of change may be minimized, thereby matching the elliptical model to the three-dimensional image information.

The determination unit 30 may calculate an error between the plane of the elliptical model and the plane of the three-dimensional image after matching, compare the calculated error with a reference value, determine that the subject is the user's face used improperly if the calculated error exceeds the reference value, and determine that the subject is the same person as the user, i.e., the user's face is not improperly used if the calculated error is less than the reference value.

If the subject's face is the user's face, the three-dimensional image information of the face area of the subject may be stereoscopic information. If the elliptical model is matched to the three-dimensional image of the face area, the error between the three-dimensional image plane and the elliptical model plane may be small. Since the elliptical model corresponds to the three-dimensional image information of the user, the error between the three-dimensional image plane and the elliptical model plane may be very small.

In contrast, if the subject is the photo, the three-dimensional image information of the face area of the subject may be planar information. If the elliptical model is matched to the three-dimensional information of the face area, the error between the three-dimensional image plane and the elliptical model plane may be large.

The reference value may be used to determine whether the image of the subject is the stereoscopic or planar image and is acquired by experimentation.

The error may be an error between three-dimensional information calculated and stored during user registration and the elliptical model. The error may be stored according to users and may have a predetermined error range.

Figure 5A:
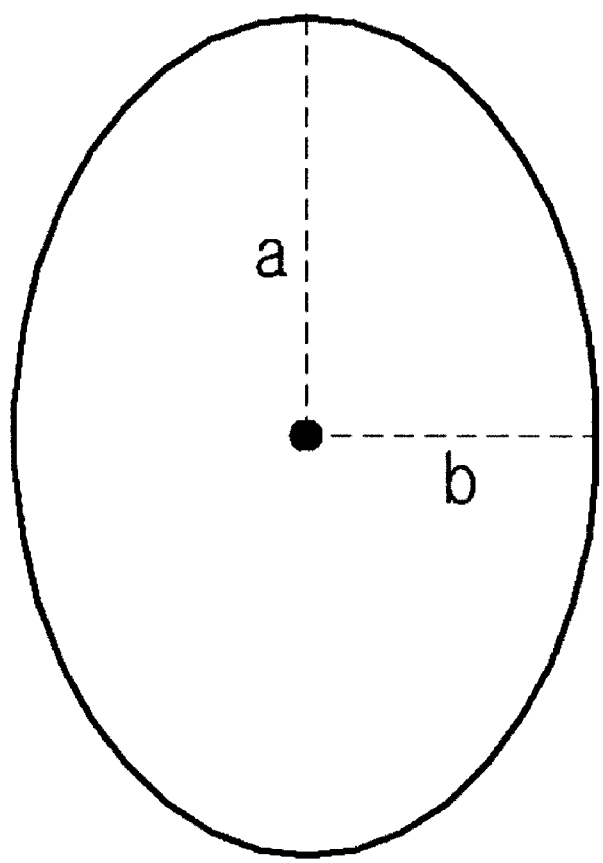
FIG. 5 is a view illustrating generation of an ellipsoid in a facial recognition apparatus according to example embodiments.

The ellipsoid generation unit 70 may generate an ellipsoid corresponding to the face area extracted by the face extraction unit 20 as shown in FIG. 5(A), when the user registration information is input through the input unit 60. The ellipsoid may have radii a and b.

The ellipsoid generation unit 70 may generate an elliptical model with the radii a and b of the ellipsoid and a normal line to the elliptical plane. The normal line may extend from an intersection point between the radii a and b of the ellipsoid and have a predetermined length c.

The predetermined length c may be changed according to the radii a and b of the ellipsoid.

Figure 5B:
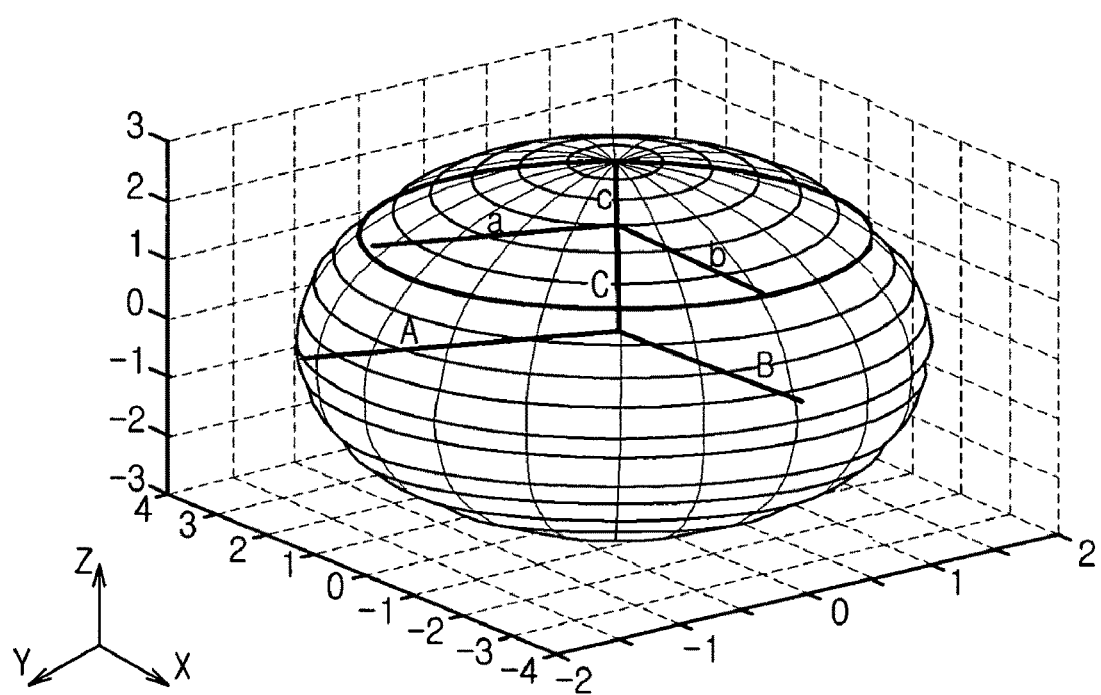

The elliptical model with the radii a and b may be generated based on a reference model of an ellipsoid formed by A, B and C shown FIG. 5B. The length c of the normal line to the elliptical plane may be set in advance.

The ellipsoid generation unit 70 may acquire three-dimensional point cloud data of the elliptical model when the elliptical model is generated and transmit the three-dimensional point cloud data to the user information database 40. The acquired three-dimensional point cloud data may include constrained features of the subject.

The user information database 40 may store the elliptical model corresponding to the three-dimensional face information of the user, the two-dimensional face information of the user, and the three-dimensional point cloud data of the elliptical model.

The number of users may be one or more. If a plurality of users is stored, the elliptical models corresponding to the three-dimensional face information of the users and the two-dimensional face information thereof may be stored. At this time, basic personal information such as name, sex, and birthday of the user may also be stored.

The display unit 50 may display information indicating whether the image of the subject's face acquired by the image acquisition unit 10 is the stereoscopic image of the user's face or the planar image, i.e., the photo image of the user's face, according to the instruction of the control unit 1.

The input unit 60 may receive the user registration information by the input of a registration key (not shown) and transmit a user registration signal to the control unit 1, and receive the personal information of the user and transmit the personal information of the user to the control unit 1.

The facial recognition apparatus may be applicable not only to security and authentication and but also to computer animation, avatar generation using the Web, robotics and multimedia.

Figure 6:
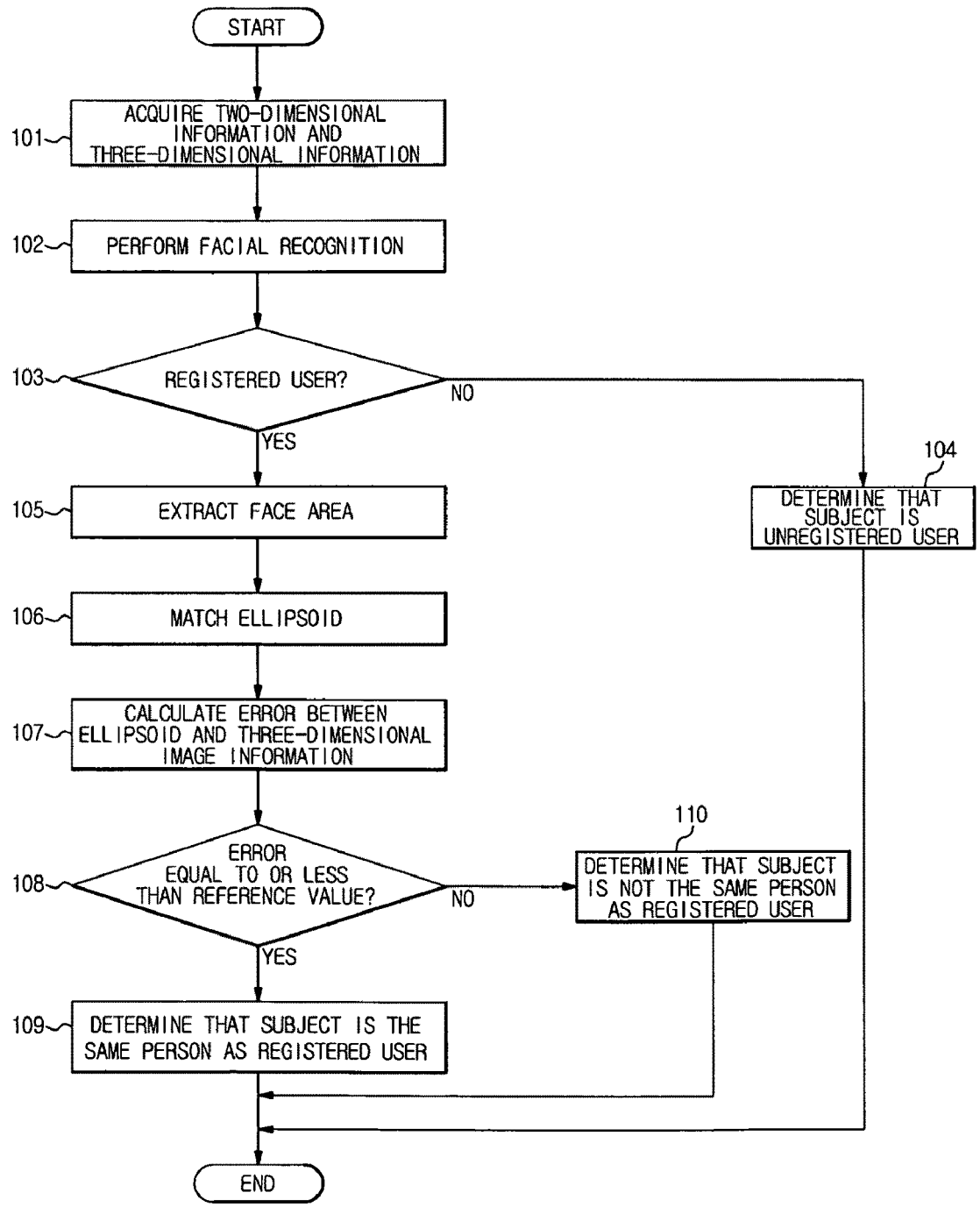
FIG. 6 is a flowchart illustrating a facial recognition method according to example embodiments.

FIG. 6 is a flowchart illustrating a facial recognition method according to example embodiments. The facial recognition method will be described with reference to FIGS. 1 to 5.

First, the two-dimensional image information and the three-dimensional image information (depth image) of the subject may be acquired (101). A TOF camera may be used.

More particularly, when the subject is detected, light may be focused by a focusing unit (not shown). When the focused light is sensed by an image pickup unit (an image sensor such as a CMOS image sensor or a CCD which is not shown), the signal of the sensed light may be converted into an electrical signal and the image of the converted electrical signal is stored as an image file with two-dimensional image information.

Simultaneously, the infrared light may be irradiated to the subject, the TOF of the infrared light is counted, and distance information corresponding to the counted TOF is calculated. The three-dimensional image information with the distance information of the subject may be stored.

The three-dimensional image with the distance information may be called a depth image.

Next, the face area may be detected using the edge and color information of the two-dimensional image information and the feature points such as eyes, nose and mouth may be extracted from the detected face area, thereby performing facial recognition (102).

The feature points of the recognized face and the feature points of the user's two-dimensional face information stored in the user information database 40 are compared to determine whether the recognized face is the registered user's face (103).

If the feature points of the recognized face and the feature points of the user's two-dimensional face information stored in the user information database 40 are not equal to each other, it may be determined that the recognized face is an unregistered user's face (104) and, if the feature points of the recognized face and the feature points of the user's two-dimensional face information stored in the user information database 40 are equal to each other, it may be determined that the recognized face is a registered user's face.

Next, the face area may be detected using the edge and color information of the two-dimensional image information, the edges are extracted from the three-dimensional image information within the detected area, and the face area is extracted based on the extracted edges (105).

Next, the elliptical model of the user may be extracted from the user information database 40 and the extracted elliptical model of the user may be matched to the three-dimensional image information (106), as shown in FIGS. 4A and 4B. Matching may be performed using ICP.

In the ICP matching, the subject's face and the pose change degree of the elliptical model stored in the user information database may be detected and the detected change degree is minimized to match the elliptical model to the three-dimensional image information.

The ICP matching will now be described in more detail.

The three-dimensional image information of the subject's face and the elliptical model may be matched. A difference between the three-dimensional image information of the subject's face and the elliptical model stored in the user information database may be detected.

Each of the three-dimensional image information of the subject's face and the elliptical model may have three-dimensional point cloud data.

Next, closest point sets corresponding to points between the three-dimensional point cloud data of the three-dimensional image information of the subject's face and the three-dimensional point cloud data of the elliptical model may be found. Three-dimensional conversion parameters to minimize a distance between the point sets, i.e., a rotation vector and a translation vector, may be obtained.

A point set, the distance from two pieces of data of which is smallest, may be found while moving the elliptical model using the translation vector, and the rotation vector to minimize the distance may be obtained, thereby making the three-dimensional image information of the subject's face coincide with the elliptical model. The above process may be repeated until a distance error is minimized and the three-dimensional image information of the subject's face coincides with the elliptical model.

The error between the plane of the elliptical mode and the plane of the three-dimensional image when the distance between the plane of the three-dimensional image of the subject's face and the plane of the elliptical mode is minimized may be calculated (107) and the calculated error may be compared with the reference value (108).

If the error is equal to or less than the reference value, it may be determined that the subject is the same person as the user, and the user's face is not improperly used (109), to display information indicating that the subject is the registered user.

If the calculated error exceeds the reference value, it may be determined that the user's face is improperly used and it is determined that the subject is not the same person as the registered user (110).

Information indicating that the subject is not the registered user may be displayed. Alternatively, information indicating that the user's face is improperly used may be displayed. This will be described in more detail with reference to FIGS. 2 and 3.

If the subject's face is the user's face, the three-dimensional image information of the face area of the subject may be stereoscopic information. If the elliptical model is matched to the three-dimensional image of the face area, the error between the three-dimensional image plane and the elliptical model plane may be small. Since the elliptical model corresponds to the three-dimensional image information of the user, the error between the three-dimensional image plane and the elliptical model plane may be very small.

In contrast, if the subject is the photo, the three-dimensional image information of the face area of the subject may be planar information. If the elliptical model is matched to the three-dimensional information of the face area, the error between the three-dimensional image plane and the elliptical model plane may be large.

The subject's face may be recognized using the two-dimensional image information and the three-dimensional image information of the subject, and it may be determined whether the recognized face is the registered user's face, thereby improving facial recognition reliability. Thus, information security is improved.

The order of user registration will be described as follows.

If the user registration information is input by the input of the registration key (not shown) of the input unit 60, the personal information of the user may be received and stored, and the two-dimensional image information and the three-dimensional image information of the user may be acquired by the two-dimensional information acquisition unit 11 and the three-dimensional information acquisition unit 12.

Next, the face area may be detected using the edge and color information of the two-dimensional image information, the feature points such as eyes, nose and mouth are extracted from the detected face area to perform facial recognition, and the recognized face information is stored.

Next, the face area may be detected using the edge and color information of the two-dimensional image information, the edges are extracted from the three-dimensional image information within the detected area, and the face area is extracted based on the extracted edges.

Next, as shown in FIG. 5A, the ellipsoid corresponding to the face area may be generated. The ellipsoid may have radii a and b. The ellipsoid generation unit 70 may generate an elliptical model formed by the radii a and b of the ellipsoid and the normal line to the elliptical plane.

The normal line may extend from an intersection point between the radii a and b of the ellipsoid and have a predetermined length c.

Next, when the elliptical model is generated, three-dimensional point cloud data of the elliptical model may be acquired and stored to perform user registration.

The acquired three-dimensional point cloud data may include constrained features of the subject.

The predetermined length c may be changeable according to the radii a and b of the ellipsoid.

The elliptical model with the radii a and b may be generated based on a reference model of an ellipsoid formed by A, B and C shown FIG. 5B. The length c of the normal line to the elliptical plane may be set in advance.

A facial recognition method according to example embodiments will be described.

First, the two-dimensional image information and the three-dimensional image information (depth image) of the subject may be acquired.

Next, the face area may be detected using the edge and color information of the two-dimensional image information, and the feature points such as eyes, nose, and mouth are extracted from the detected face area, thereby performing facial recognition.

The feature points of the recognized face and the feature points of the user's two-dimensional face information stored in the user information database 40 may be compared to determine whether the recognized face is the registered user's face.

If the feature points of the recognized face and the feature points of the user's two-dimensional face information stored in the user information database 40 are not equal to each other, it may be determined that the subject is an unregistered user and, if the feature points of the recognized face and the feature points of the user's two-dimensional face information stored in the user information database 40 are equal to each other, it is determined that the subject is a registered user.

Next, the face region may be detected using the edge and color information of the two-dimensional image information, the edges are extracted from the three-dimensional image information within the detected area, and the face area is extracted based on the extracted edges.

The ellipsoid corresponding to the face area may be generated. The ellipsoid may have radii a and b. The ellipsoid generation unit 70 may generate an elliptical model formed by the radii a and b of the ellipsoid and a normal line to the elliptical plane.

The normal line may extend from an intersection point between the radii a and b of the ellipsoid and have a predetermined length c.

Next, the generated elliptical model may be matched to the three-dimensional image information.

Next, the error between the plane of the elliptical model and the plane of the three-dimensional image when the distance between the plane of the three-dimensional image of the subject's face and the plane of the elliptical model is minimized may be calculated, and the calculated error is compared with the reference value.

If the error is equal to or less than the reference value, it may be determined that the subject is the same person as the user, and the user's face is not improperly used. Information indicating that the subject is the registered user may be displayed.

If the calculated error exceeds the reference value, it may be determined that the user's face is improperly used and it is determined that the subject is not the same person as the registered user.

If the subject's face is the user's face as shown in FIG. 2, the three-dimensional image information of the face area of the subject may be stereoscopic information. If the elliptical model is matched to the three-dimensional image of the face area, the error between the three-dimensional image plane and the elliptical model plane may be small.

In contrast, if the subject is the photo as shown in FIG. 3, the three-dimensional image information of the face area of the subject may be planar information. If the elliptical model is matched to the three-dimensional information of the face area, the error between the three-dimensional image plane and the elliptical model plane may be large.

The subject's face may be determined using the two-dimensional image information and the three-dimensional image information of the subject and it may be determined whether the recognized face is the registered user's face used, thereby improving facial recognition reliability. Thus, information security is improved.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A facial recognition apparatus, comprising:
a two-dimensional information acquisition unit to acquire two-dimensional image information of a subject;
a three-dimensional information acquisition unit to acquire three-dimensional image information of the subject;
a user information database to store an elliptical model corresponding to three-dimensional face information of a user and two-dimensional face information of the user; and
a control unit to perform facial recognition using the two-dimensional image information of the subject, to determine whether a recognized face is the user's face, to match the elliptical model of the user to the three-dimensional image information to calculate an error upon determining that the recognized face is the user's face, and to determine whether the user's face is improperly used based on the error.

2. The facial recognition apparatus according to claim 1, wherein the three-dimensional information acquisition unit acquires distance information corresponding to a Time-Of-Flight (TOF) of an infrared light irradiated to the subject and incident thereto.

3. The facial recognition apparatus according to claim 1, wherein the control unit includes a determination unit to determine that the user's face is improperly used if the error exceeds a reference value and to determine that the subject is a same person as the user if the error is equal to or less than the reference value.

4. The facial recognition apparatus according to claim 3, further comprising a display unit to display whether the user's face is improperly used according to an instruction of the control unit.

5. The facial recognition apparatus according to claim 1, wherein the control unit includes a face extraction unit to extract a face area based on the two-dimensional image information and the three-dimensional image information.

6. The facial recognition apparatus according to claim 5, wherein the face extraction unit extracts the face area from the three-dimensional image information using edge information.

7. The facial recognition apparatus according to claim 5, wherein the control unit matches the elliptical model to the three-dimensional image information of the face area using Iterative Closest Point (ICP).

8. The facial recognition apparatus according to claim 7, wherein the control unit calculates an error between a plane of the elliptical model and a plane of the three-dimensional image information.

9. The facial recognition apparatus according to claim 5, further comprising:
an input unit to receive user registration information and personal information of the user; and
an ellipsoid generation unit to generate the elliptical model using a size of an ellipsoid corresponding to the face area of the user,
wherein the control unit stores the personal information of the user if the user registration information is received through the input unit and stores the two-dimensional face information and the elliptical model of the user in the user information database.

10. A facial recognition method, comprising:
acquiring, by a processor, two-dimensional image information and three-dimensional image information of a subject;
performing, by the processor, facial recognition using the two-dimensional image information;
determining, by the processor, whether a recognized face is a registered user's face;
matching, by the processor, an elliptical model of the user to the three-dimensional image information to calculate an error upon determining that the recognized face is the user's face; and determining, by the processor, whether the user's face is improperly used based on the error.

11. The facial recognition method according to claim 10, wherein the acquiring of the three-dimensional image information includes:
   irradiating the subject with infrared light;
   acquiring distance information corresponding to a Time-Of-Flight (TOF) of the infrared light; and
   generating three-dimensional image information corresponding to the distance information.

12. The facial recognition method according to claim 10, wherein the matching of the elliptical model of the user to the three-dimensional image information is performed using Iterative Closest Point (ICP).

13. The facial recognition method according to claim 12, wherein the calculating of the error includes calculating an error between a plane of the elliptical model and a plane of the three-dimensional image information.

14. The facial recognition method according to claim 10, wherein the determining of whether the user's face is improperly used based on the error includes:
   determining whether the subject is the user's face used improperly if the error exceeds a reference value; and
   determining whether the subject is a same person as the user if the error is equal to or less than the reference value.

15. The facial recognition method according to claim 10, wherein the matching of the elliptical model of the user to the three-dimensional image information further includes:
   extracting a face area based on the two-dimensional image information and the three-dimensional image information; and
   matching the elliptical model to the face area.

16. The facial recognition method according to claim 10, further comprising:
   receiving personal information of the user if user registration information is input;
   receiving two-dimensional image information and three-dimensional image information of the user;
   performing facial recognition using the two-dimensional image information to acquire two-dimensional face information;
   generating the elliptical model using the two-dimensional image information and the three-dimensional image information; and
   storing the personal information of the user, the two-dimensional face information and the elliptical model to perform user registration.

17. At least one non-transitory computer readable medium comprising computer readable instructions that control at least one processor to implement the method of claim 10.

18. A facial recognition method, comprising:
   acquiring, by a processor, three-dimensional image information of a subject;
   extracting, by the processor, a face area from the three-dimensional image information;
   generating, by the processor, an elliptical model using an ellipsoid corresponding to the face area;
   performing, by the processor, facial recognition using the three-dimensional image information of the subject;
   determining, by the processor, whether a recognized face is a user's face;
   matching, by the processor, the elliptical model to the three-dimensional image information to calculate an error upon determining that the recognized face is the user's face; and
   determining, by the processor, whether the user's face is improperly used based on the error.

19. The facial recognition method according to claim 18, wherein the matching of the elliptical model to the three-dimensional image information of the face area is performed using Iterative Closest Point (ICP).

20. The facial recognition method according to claim 18, wherein the generating of the ellipsoid includes generating an ellipsoid formed by two diameters of the ellipsoid corresponding to the face area and a normal line to an intersection point between the two diameters, and the normal line has a predetermined diameter.

21. The facial recognition method according to claim 18, wherein the determining of whether the user's face is improperly used includes:
   determining whether the user's face is improperly used if the error exceeds a reference value; and
   determining whether the subject is a same person as the user if the error is equal to or less than the reference value.

22. At least one non-transitory computer readable medium comprising computer readable instructions that control at least one processor to implement the method of claim 18.

23. A method, comprising:
   acquiring, by a processor, two-dimensional and three-dimensional information of a first face;
   performing, by the processor, facial recognition on the two-dimensional information and determining whether the first face matches a second face stored in a user information database;
   comparing, by the processor, an elliptical model of the first face based on the three-dimensional information with an elliptical model of the second face stored in the user information database; and
   determining, by the processor, if the second face differs from the first face by more than a predetermined amount based on the performing and the comparing.

* * * * *

UNITED STATES PATENT AND TRADEMARK OFFICE
CERTIFICATE OF CORRECTION

PATENT NO.         : 8,406,484 B2
APPLICATION NO.    : 12/980913
DATED              : March 26, 2013
INVENTOR(S)        : Suk June Yoon et al.

It is certified that error appears in the above-identified patent and that said Letters Patent is hereby corrected as shown below:

On the Title Page

Column 1, Item [30] (Foreign Application Priority Data), line 1, Insert --Jan. 5, 2010 (KR) ... 10-2010-0000500--

Signed and Sealed this
Second Day of June, 2015

Michelle K. Lee
*Director of the United States Patent and Trademark Office*